United States Patent
Bodum (10) Patent No.: US 10,045,652 B2
(45) Date of Patent: Aug. 14, 2018

(54) FILTER INSERT

(75) Inventor: Jørgen Bodum, Meggen (CH)

(73) Assignee: PI-DESIGN AG, Triengen (CH)

(*) Notice: Subject to any disclaimer, the term of this patent is extended or adjusted under 35 U.S.C. 154(b) by 1614 days.

(21) Appl. No.: 12/161,106

(22) PCT Filed: Jan. 20, 2006

(86) PCT No.: PCT/CH2006/000044
§ 371 (c)(1),
(2), (4) Date: Jul. 16, 2008

(87) PCT Pub. No.: WO2007/082391
PCT Pub. Date: Jul. 26, 2007

(65) Prior Publication Data
US 2009/0199722 A1   Aug. 13, 2009

(51) Int. Cl.
| | |
|---|---|
| A47J 31/06 | (2006.01) |
| B01D 35/02 | (2006.01) |
| A47J 31/02 | (2006.01) |
| A47J 31/20 | (2006.01) |

(52) U.S. Cl.
CPC ........... *A47J 31/0636* (2013.01); *A47J 31/02* (2013.01); *A47J 31/20* (2013.01); *A47J 31/0626* (2013.01)

(58) Field of Classification Search
CPC ........ A47J 31/02; A47J 31/0636; A47J 31/20; A47J 31/0626; A47J 31/06; B01D 35/02
USPC ............................................ 99/323; 210/474
See application file for complete search history.

(56) References Cited

U.S. PATENT DOCUMENTS

| | | | | |
|---|---|---|---|---|
| 1,108,108 | A * | 8/1914 | Gifford | 215/226 |
| D48,033 | S * | 10/1915 | Kaye | D9/453 |
| 1,777,909 | A * | 10/1930 | Brookes | 99/322 |
| 2,291,060 | A * | 7/1942 | Schiess | 426/82 |
| 2,529,672 | A * | 11/1950 | Black | 219/214 |
| 2,546,874 | A * | 3/1951 | Siegrist | 210/489 |
| 2,684,624 | A * | 7/1954 | Alvarez | 99/298 |
| 2,686,597 | A * | 8/1954 | Lilja | 210/469 |
| 2,788,733 | A * | 4/1957 | Jacques | 99/323 |
| 3,281,001 | A * | 10/1966 | Stuart | 215/254 |
| 3,389,650 | A * | 6/1968 | Michielsen | 99/295 |
| 3,446,624 | A * | 5/1969 | Luedtke | 426/77 |
| 4,069,751 | A * | 1/1978 | Gronwick et al. | 99/306 |
| 4,374,026 | A * | 2/1983 | Greutert | 210/493.5 |
| 4,419,232 | A * | 12/1983 | Arntyr et al. | 210/164 |
| D278,116 | S * | 3/1985 | Gavin et al. | D7/400 |

(Continued)

FOREIGN PATENT DOCUMENTS

| | | |
|---|---|---|
| CA | 2045569 A1 | 7/1990 |
| DE | 89 00 513 U1 | 5/1989 |

(Continued)

OTHER PUBLICATIONS

Japanese Office Action corresponding to Japanese Patent Application No. 2008-550598, dated Aug. 29, 2011.

*Primary Examiner* — Eric Stapleton
(74) *Attorney, Agent, or Firm* — Sughrue Mion, PLLC (57) ABSTRACT

A filter insert (1) for insertion into an insert opening (91) of a vessel (9) for the purpose of extracting beverages has a base body (3), which has filter openings (51), and a sleeve. A circumferential region of the sleeve has a corrugated elastic outer contour (21) which serves to flexibly match said filter insert to an internal dimension of the insert opening (91) of the vessel (9).

22 Claims, 6 Drawing Sheets

(56) References Cited

U.S. PATENT DOCUMENTS

| | | | |
|---|---|---|---|
| 4,656,932 A * | 4/1987 | Kopp | 99/295 |
| 4,728,425 A * | 3/1988 | Sandvig | 210/477 |
| 4,832,845 A * | 5/1989 | Hendretti | 210/470 |
| 4,865,737 A * | 9/1989 | McMichael | 210/477 |
| 4,963,262 A * | 10/1990 | Johnstone | 210/474 |
| 5,076,425 A * | 12/1991 | Plone | 206/220 |
| 5,120,439 A * | 6/1992 | McFarlin | 210/482 |
| 5,147,540 A * | 9/1992 | Hagan | 210/232 |
| 5,290,444 A * | 3/1994 | Campbell | 210/473 |
| 5,298,267 A * | 3/1994 | Gruenbacher | 426/77 |
| 5,363,745 A * | 11/1994 | Lin | 99/306 |
| 5,424,083 A * | 6/1995 | Lozito | 426/82 |
| 5,507,948 A * | 4/1996 | Wargo et al. | 210/479 |
| 5,549,037 A * | 8/1996 | Stumphauzer et al. | 99/323.1 |
| D374,844 S * | 10/1996 | Weder et al. | D11/164 |
| 5,633,026 A * | 5/1997 | Gruenbacher | 426/77 |
| 5,858,437 A * | 1/1999 | Anson | 426/431 |
| 5,894,786 A * | 4/1999 | Miya | 99/306 |
| 5,927,179 A * | 7/1999 | Mordini et al. | 99/304 |
| 5,952,028 A * | 9/1999 | Lesser | 426/433 |
| 5,979,300 A * | 11/1999 | Donovan | 99/323 |
| 6,012,379 A * | 1/2000 | Matuschek | 99/323 |
| D424,369 S * | 5/2000 | Bielfeldt et al. | D7/400 |
| 6,189,438 B1 * | 2/2001 | Bielfeldt et al. | 99/321 |
| 6,263,781 B1 * | 7/2001 | Calagui | 99/323 |
| D447,086 S * | 8/2001 | Weder | D11/164 |
| D455,608 S * | 4/2002 | McWilliams | D7/400 |
| 6,422,132 B1 * | 7/2002 | Devine | 99/284 |
| 6,487,961 B2 * | 12/2002 | Bunn | 99/323 |
| 6,662,955 B1 * | 12/2003 | Lassota | 210/482 |
| 6,786,136 B2 * | 9/2004 | Cirigliano et al. | 99/323 |
| 6,805,042 B2 * | 10/2004 | Mordini et al. | 99/299 |
| D511,069 S * | 11/2005 | Johns | D7/400 |
| 7,318,374 B2 * | 1/2008 | Guerrero | 99/322 |
| 7,346,938 B2 * | 3/2008 | Mattson et al. | 4/507 |
| 7,669,519 B2 * | 3/2010 | Pope et al. | 99/315 |
| 2002/0100370 A1 * | 8/2002 | Bunn | 99/323 |
| 2003/0209151 A1 * | 11/2003 | Mordini et al. | 99/323 |
| 2007/0089614 A1 * | 4/2007 | Tremblay | 99/495 |

FOREIGN PATENT DOCUMENTS

| | | |
|---|---|---|
| DE | 0 467 013 A1 | 1/1992 |
| EP | 1 260 165 A1 | 11/2002 |
| JP | 126346 Y2 | 8/1989 |
| JP | 613724 U | 2/1994 |
| JP | 11-290214 A | 10/1999 |
| JP | 2000262406 A | 9/2000 |
| WO | 92/13475 A1 | 8/1992 |

* cited by examiner

FILTER INSERT

TECHNICAL FIELD OF THE INVENTION

The present invention relates to a filter insert for inserting in an insertion opening of a vessel for the purpose of extraction of beverages according to the preamble of patent claim 1, and to a vessel with a filter insert according to the preamble of patent claim 11. The filter insert is especially suitable for the preparation of coffee and tea.

BACKGROUND OF THE INVENTION

For the preparation of beverages, a great variety of filter inserts are used.

DE-A-2'136'580, for example, discloses a device for the infusion and filtering of beverages with residues. The filter insert in this case is formed by a spring-mounted holder, which can be inserted in the pot opening, and a disposable insert which can be clamped by means of this holder. The holder in this case is designed in the form of a rod and has a compression spring. The process of inserting is rather laborious, since both the holder and the disposable insert have to be inserted. It is also disadvantageous that disposable inserts have to be used.

EP-A-0'467'013 discloses a tea filter device, in which a paper filter bag is retained by means of two opposite clamping segments. The two clamping segments are movable parallel to each other. Also in this case, disposable filter bags are used with it. The tea filter device can be fitted to a vessel, for example to a jug.

If now the jug is tilted during the pouring out of the beverage, then it can happen that the tea filter device becomes loose and falls out of the jug.

Furthermore, filter inserts are known which can be used several times and do not require disposable products. These filter inserts customarily consist of glass, metal or plastic. WO 92/13475 discloses such a filter insert for vessels, wherein the filter insert can be used several times. The filter insert is inserted in the vessel and then hot water can be added in the vessel. Also in the case of this filter insert, it is possible that it can fall out of the jug during the pouring out of the beverage.

Moreover, it is known to provide such filter inserts with a cap consisting of a soft material, wherein a type of brim is formed. In this case, this filter insert can lie on the upper rim of a pot by means of the brim. These filter inserts also have the disadvantage that they can fall out of the jug when pouring out the beverage.

SUMMARY OF THE INVENTION

It is therefore an object of the invention to create a filter insert which can be inserted in a jug in a simple manner, and which cannot fall out of the jug when pouring out the beverage. Furthermore, the filter insert according to the invention should be as universally useable as possible.

This object is achieved by a filter insert with the features of patent claim 1.

The filter insert according to the invention for inserting in an insertion opening of a vessel for the purpose of extraction of beverages preferably has a main body, with filtering holes, and a collar. The collar has an elastic wave-form outside contour over a circumferential region. The outside contour serves for the flexible adaptation to an inside dimension of the insertion opening of the vessel. This wave-form outside contour prevents the filter insert from falling out when pouring out the beverage.

Moreover, it is advantageous that this filter insert can be universally inserted in diverse jugs. A further advantage of the wave-form outside contour is that this can compensate manufacturing tolerances. Consequently, the corresponding jugs no longer have to be manufactured so accurately and can therefore be produced more cost-effectively. Furthermore, it is advantageous that as a result of the elastic design of the wave-form outside contour the vessel can no longer be damaged by the filter insert. Cracks, scratches or other damage to the vessel can therefore be prevented by means of the collar.

The filter insert according to the invention preferably has an at least partially surrounding flange. The flange serves for holding the filter insert in the inserted state, so that it does not fall into the jug. In this case, an upper region of the collar is part of this flange.

It is a further object of the invention to create a filter insert which even in the hot state can be removed from the vessel with bare hands.

This object is achieved by a filter insert with the features of patent claim 3.

The filter insert according to the invention has a flange. The flange comprises an at least partially surrounding ring. The collar has an upper region which extends over at least a part of an outer rim of this ring. The circumferential region with the wave-form outside contour is located beneath this upper region. This brings the advantage that the user can remove the filter insert from the vessel with bare hands.

In a preferred embodiment, the collar is in one piece and has both the wave-form outside contour as well as the insulating cover. The collar being made in one piece offers the advantage of the collar being cost-effectively produced and simply installed. Moreover, handling by the user is simplified.

Further advantageous embodiments are apparent from the dependent claims.

BRIEF DESCRIPTION OF THE DRAWING

The invention is explained in more detail in the following, with reference to the drawing. In the drawing.

DESCRIPTION OF AN EXEMPLARY EMBODIMENT

Figure 1:
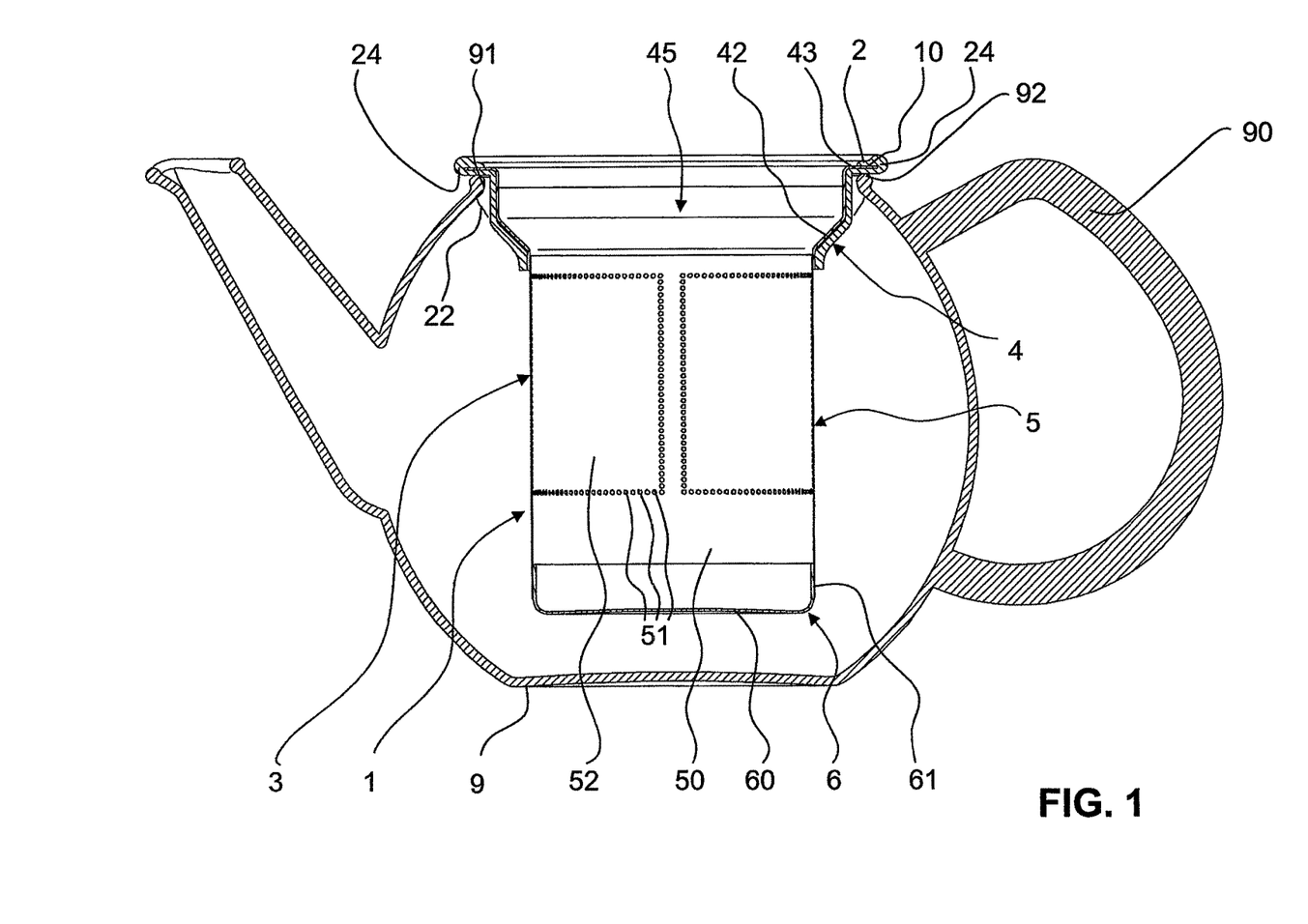
FIG. 1 shows a cross section of a teapot with a filter insert according to the present invention.

FIG. 1 shows a filter insert 1 according to a preferred exemplary embodiment of the present invention. The filter insert 1 in this case is inserted in a vessel 9, in this case a coffee pot or a tea jug, and can be used for extraction of beverages, especially tea or coffee. The filter insert 1 essentially comprises a one-piece or multi-piece main body 3 with filtering holes 51, and a collar 2 which is located over a part of the main body 3.

Figure 6:
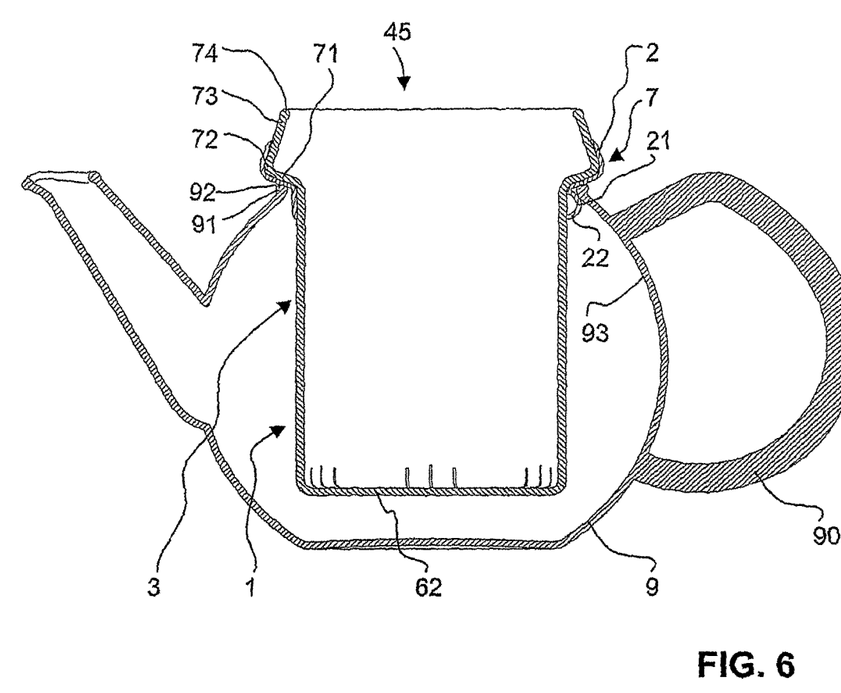
FIG. 6 shows a cross section of a teapot with a filter insert according to a further embodiment of the present invention.

The main body 3 can essentially be divided into three sections, these being an upper support section 4 with an at least partially surrounding flange 10, a central hollow cylinder-form filter section 5 with a multiplicity of filtering holes 51, and a lower bottom section 6 with a collecting pan 60. As is shown here, support section 4, filter section 5 and bottom section 6 can be formed as separate parts which are interconnected in a separable or fixed manner. By means of the flange 10, which is preferably formed from a support ring 27 of the collar 2 and an at least partially surrounding ring 44 of the support section 4, the filter insert 1 lies upon an opening rim 92. This prevents the filter insert from falling into the vessel 9. The main body 3 is produced from metal, glass or plastic. It preferably consists of stainless steel, wherein the main body 3 is then preferably designed in several pieces. This enables a simple production. Alternatively, the main body 3 can also be produced from glass, the main body 3 then being preferably designed in one piece. An exemplary embodiment which is designed in one piece is shown in FIG. 6. However, it is also possible to manufacture the different sections from different materials. If metallic materials are used, spot welding is especially well suited to connect the individual pieces. For other materials, other methods may be used.

Figure 2:
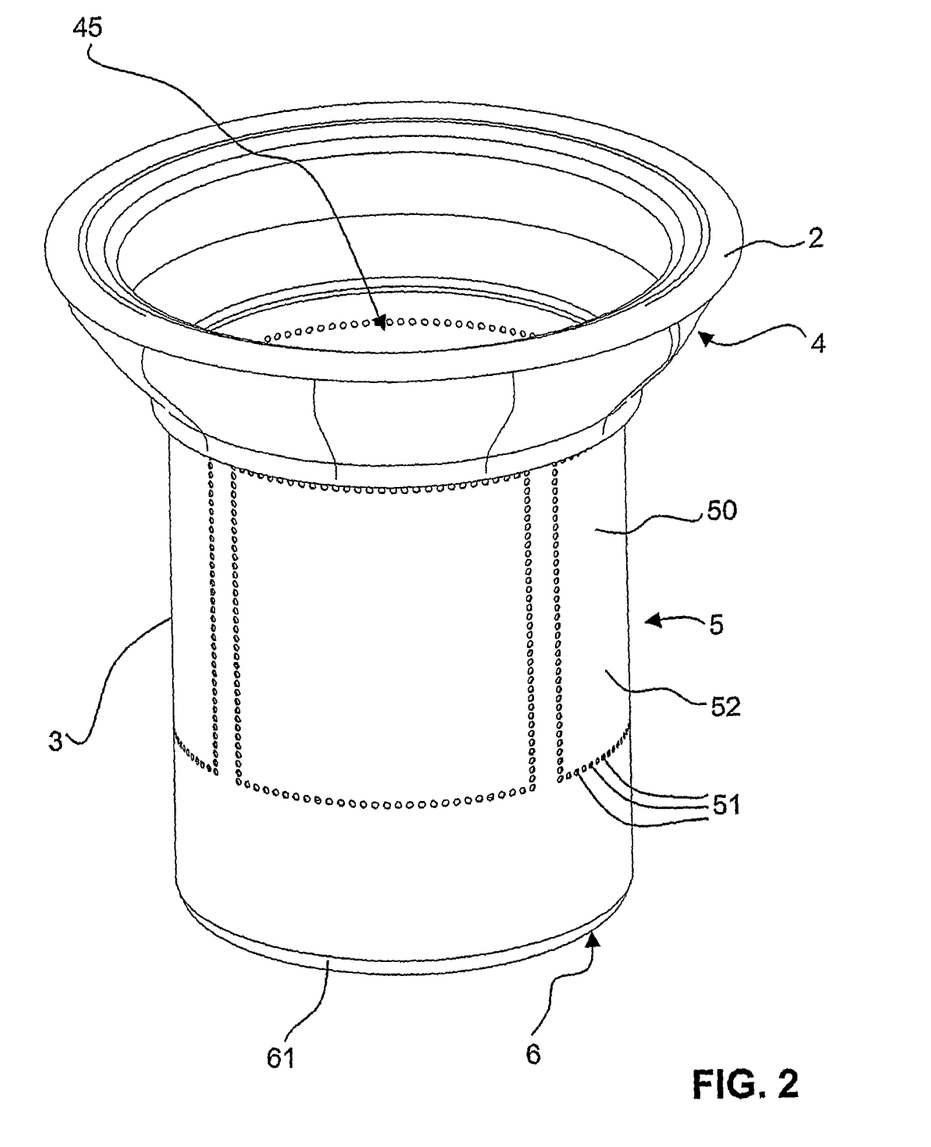
FIG. 2 shows a perspective view of the filter insert according to FIG. 1.

In FIG. 2, a pouring opening 45 is especially well visible. By means of this pouring opening 45, a hot fluid, for example hot water, is poured onto the powder which is located in the filter element. The powder can be both coffee or tea. Alternatively, chopped tea leaves, or other forms, can naturally also be used.

The filter section 5 is essentially a hollow cylindrical filter body 50, here FIGS. 1 to 4 are referred to. The filtering holes 51 are arranged in hole rows and penetrate the circumferential surface of the filter body 50, wherein a hole row has a multiplicity of filtering holes 51. A plurality of hole rows, which preferably extend in parallel, form hole areas 52. For the benefit of clarity, only the filtering holes 51 which surround such a hole area 52 are shown in each case in the figures. Four such hole areas are preferably arranged over the entire circumference of the filter section 5. Alternatively, fewer, for example three, or more hole areas can also be arranged.

The bottom section 6 essentially comprises a collecting pan 60. The collecting pan 60 has a bottom 62 (FIG. 3) and a side wall 61 which projects perpendicularly from the bottom 62. The bottom section 6 is connected to the filter section 5 via the side wall 61, as described above. Instead of the collecting pan 60, a bottom can also be used which is essentially designed flat. That is to say that this flat bottom does not have a side wall. Both the collecting pan 60 and the flat bottom can be equipped either with or without openings.

The support section 4 essentially comprises a support body 40. The support body 40 includes a cylindrical ring 41 (FIG. 3) which merges into a cylindrical wall 43 via a conical side wall 42. The cylindrical wall 43 then merges into an at least partially surrounding ring 44, wherein the at least partially surrounding ring 44 projects preferably perpendicularly from the cylindrical wall 43. The surrounding ring 44 can at least partially surround the cylindrical wall 43, that is to say it is then arranged in sections, or it can also completely surround the cylindrical wall 43. It is to be noted that the cylindrical wall 43 has a larger diameter than the cylindrical ring 41. Moreover, the outside diameter of the at least partially surrounding ring 44 has a larger diameter than the cylindrical wall 43. If the support body 40 consists of a metallic material, this can be produced for example by means of a deep-drawing process. Other suitable methods are also conceivable.

The cylindrical filter body 50 and the support body 40 are preferably interconnected in a fixed manner, wherein the filter body 50 is inserted into the support body 40. Spot welding is especially well suited for the connection. Other production methods, however, are also conceivable.

Figure 3:
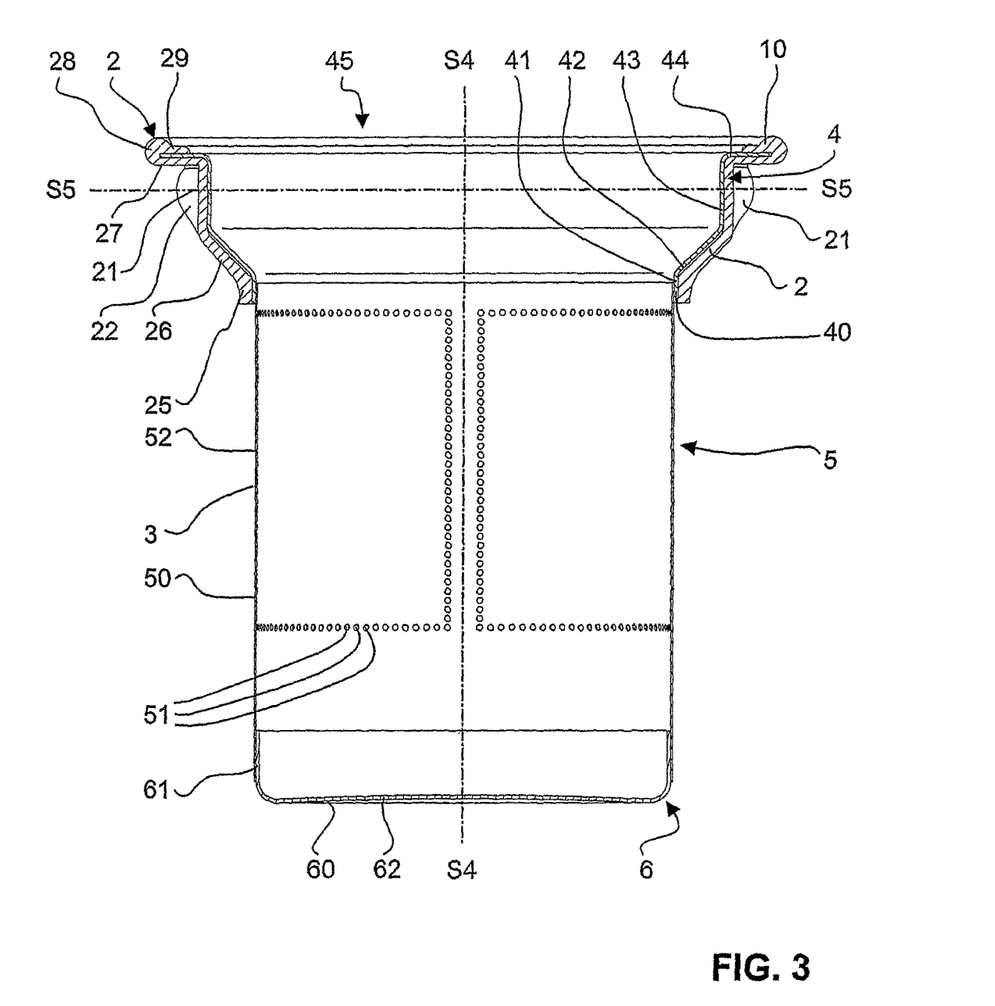
FIG. 3 shows a cross section of the filter insert according to FIG. 1, along the line S3-S3 of FIG. 4.

The collar 2 is also well visible in FIG. 1 and in FIG. 3. The collar 2 essentially covers the outside contour of the upper section of the main body 3. Preferably, the collar 2 covers the outer side of the support body 40.

Figure 4:
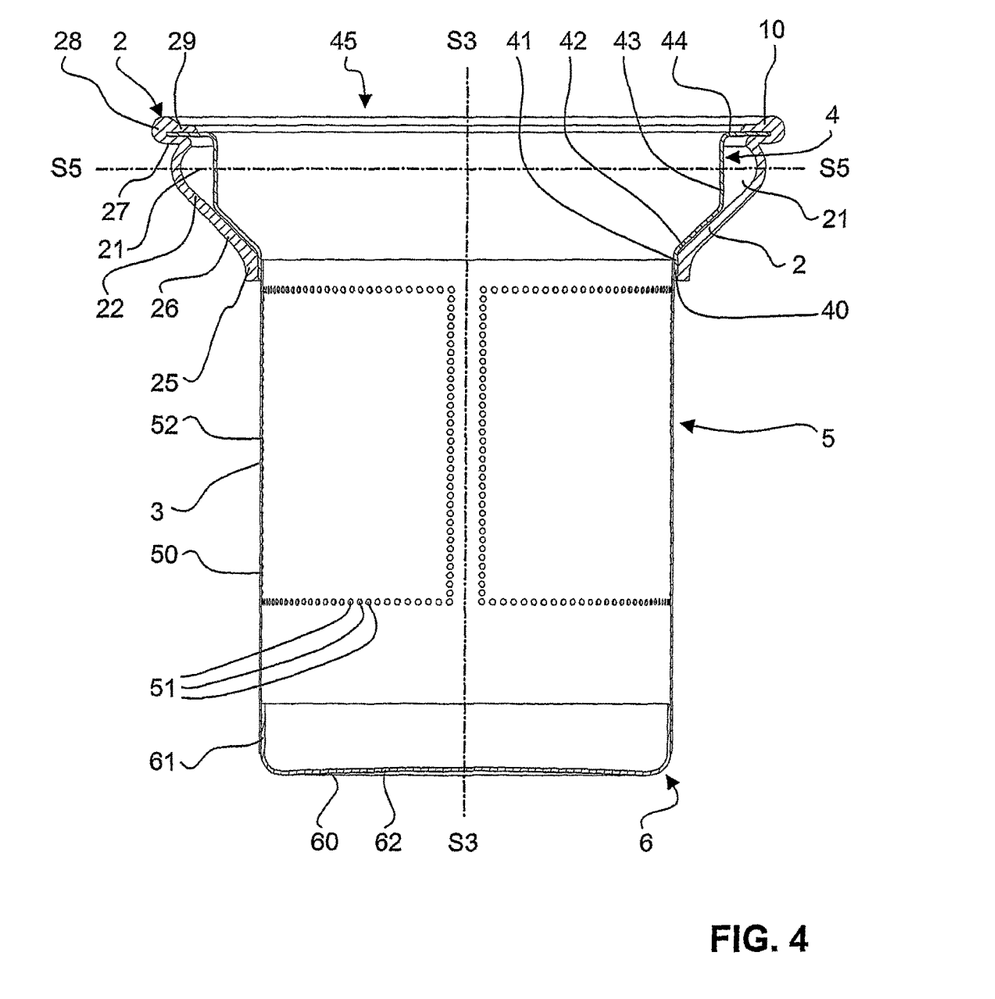
FIG. 4 shows a cross section of the filter insert according to FIG. 1, along the line S4-S4 of FIG. 3.

In FIGS. 3 and 4, the collar 2 is shown in detail. The collar 2 in a lower region is designed as a cylindrical ring 25. Via a conical transition 26, the cylindrical ring 25 then merges into a wave-form outside contour 21. The circumference of the collar 2, therefore, tapers in a lower region. The wave-form outside contour 21 extends in this case at least partially over a circumferential region of the collar 2. A support ring 27, which projects outwards, is formed on the wave-form outside contour 21. A bead 28 forms the end of the support ring 27. A cover ring 29, which extends inwards, essentially parallel to the support ring 27, is formed moreover on the bead 28, wherein an annular gap is formed between the support ring 27 and the cover ring 29. The support ring 27, the bead 28 and cover ring 29 form an insulating sleeve which in FIG. 1 is identified by the reference number 24.

The collar 2 is preferably elastic. In other embodiments, it is possible, however, that only defined sections of the collar 2 are elastic. The wave-form outside contour 21, however, is preferably always elastic.

The collar is preferably produced from a plastic that is flexible and heat-resistant. Good results were achieved with silicone rubber or a plastic which is known in the market as SANTOPRENE®. Moreover, the collar 2 is preferably designed in one piece.

The collar 2 can be slipped over the support body 40 by hand. In FIGS. 3 and 4, moreover, it can be seen that the collar 2 in some regions tightly fits on the support section 4 or on the support body 40. The cylindrical ring 41, the conical side wall 42 and the cylindrical wall 43 of the main body are preferably surrounded on their outer side by the collar 2. Moreover, the at least partially surrounding ring 44 of the support body 40 is almost completely surrounded by the collar 2, wherein this at least partially surrounding ring 44 engages in the annular gap of the collar 2. That is to say that the collar 2 extends with an upper region at least over a part of an outer rim of this ring 44. The circumferential region with the wave-form outside contour 21 is located beneath this upper region.

In the region of the at least partially surrounding ring 44, the collar 2 serves for heat insulation since the main body 3 is heated up during the pouring-in of a hot fluid. As a result of the covering of the at least partially surrounding ring 44 with the collar 2, the user has the opportunity of removing the filter insert 1 with bare hands. The user does not require any additional means, such as a cloth or similar. By means of the bead 28, the effectiveness of the heat insulation of the elastic collar 2 is further increased.

In a further exemplary embodiment, the collar 2 can be connected to the upper region of the main body 3 in a fixed manner. For example, the collar 2 can be secured against inadvertent removal by an adhesive. It is also possible, however, to install a collar so that this can be removed by the user in a problem-free manner. This is especially advantageous since a simple cleaning is made possible.

Figure 5:
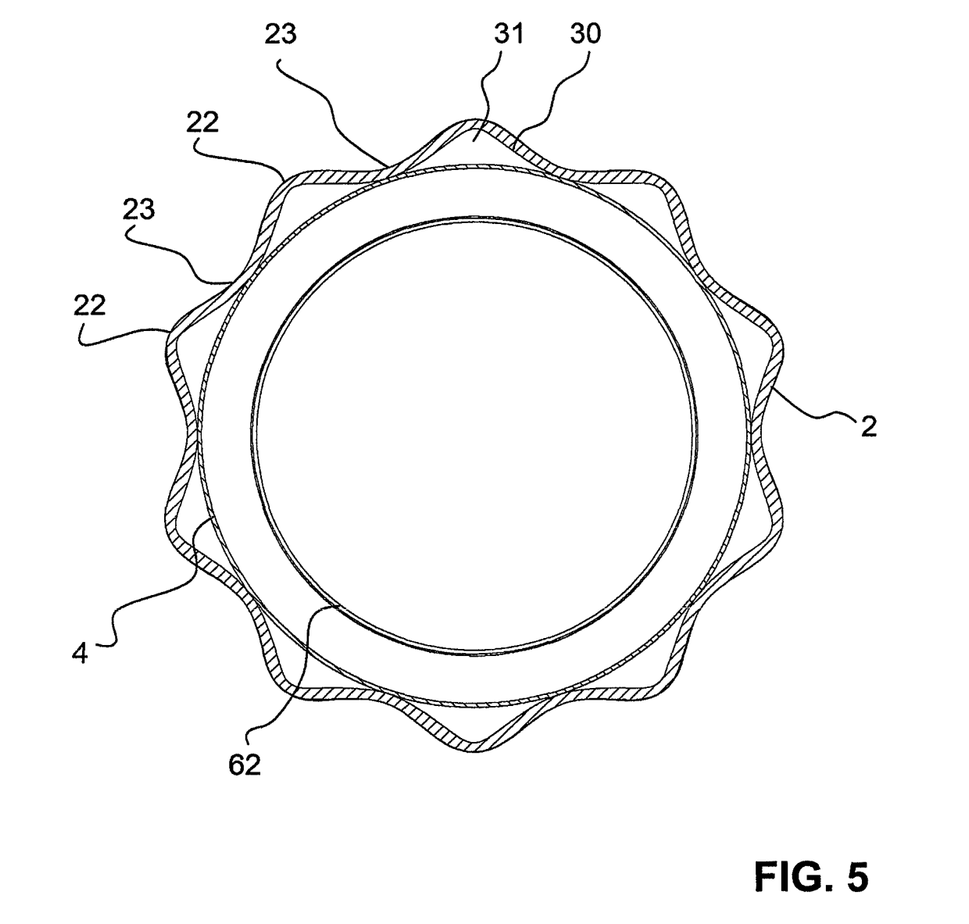
FIG. 5 shows a cross section along the line S5-S5 of the filter insert according to FIG. 3 or 4.

The wave-form outside contour 21 is especially easily visible in FIG. 5 which is a sectional view along the line S5-S5 of FIGS. 3 and 4. The wave-form outside contour, in a section which extends parallel to a support ring 27, can be described as extending around the collar like a rosette. The wave-form outside contour 21 comprises crests 22 and troughs 23 and preferably extends around the entire circumference of the collar 2. In this preferred exemplary embodiment, ten crests 22 and ten troughs 23 are arranged at regular intervals over the entire circumference of the elastic collar 2. The wave-form outside contour 21 essentially extends perpendicularly to a support plane which is parallel to the at least partially surrounding ring 44. In other words, the wave-form outside contour 21 extends upon a generated surface of a cylinder in the direction of its center axis. The thickness of the wave-form outside contour 21 is preferably variable. In particular, the thickness of the wave-form outside contour 21 at the crests 22 has a smaller dimension that in the troughs 23. This leads to a more elastic wave-form outside contour 21. In further embodiments, however, the thickness can be constant.

It can also be seen in FIG. 5 that the collar 2 also has a wave-form inside contour 30. The wave-form inside contour 30 in this case lies at least partially upon the support section 4. Gaps 31 are preferably formed between the wave-form inside contour 30 and the support section 4. The gaps 31 are preferably filled with a gaseous medium, wherein the gaseous medium can be ambient air. In a further embodiment, which is not shown, the gaps 31, however, can also be filled with a solid medium. In this case, a plastic is preferably inserted, which has similar material properties to the collar 2.

In a further embodiment, which is not shown, a wave-form outside contour extends parallel to the circumferential edges. That is to say, instead of the troughs 23 and crests 22, the corrugations of such a wave-form contour would therefore be visible in FIG. 4. The corrugations extend concentrically in the generated surface.

In a further embodiment, which is not shown, instead of a wave-form contour other elements are used, such as ribs, points or other elements which project from a cylindrical circumference.

With all the exemplary embodiments of the collar 2, it is therefore common that in the region of the wave-form contour 21, or in the region of the projecting elements, this collar must have a contour or projecting elements which are deformable. The deformable contour, that is essentially the wave-form outside contour 21, must be able to flexibly adapt to an inside dimension of the insertion opening 91 of the vessel 9 during insertion in the vessel 9, in fact so that the insertion opening 91 of the vessel 9 is contacted at least in sections by the wave-form outside contour 21 of the collar 2. Other sections, for which the insertion opening 91 is not contacted by the collar 2, then lie between the latter sections. This allows air to be able to flow into the vessel 9.

As a result of the described flexible deformation, a non-positive lock or frictional lock is achieved between the elastic collar 2 or the filter insert 1 and the vessel 9. In this manner, the filter insert 1 is prevented from being able to fall out when removing the beverage, that is to say if the vessel 9 is tilted for pouring out the beverage for example into a cup.

In a further embodiment, which is not shown, it is conceivable, moreover, that the support section 4 is designed so that this has smaller dimensions than the insertion opening 91 of the vessel 9. In this case, the filter insert 1 is then supported only by means of the collar 2. That is to say, the flange 10 then comprises only just elements of the collar 2.

In a further exemplary embodiment, which is not shown, the support section 4 has an area which is equivalent to the filter section 5. That is to say, the support section 4 and the filter section 5 are then preferably of cylindrical form. The collar 2 then also has a cylindrical inner opening. The outside contour of the collar 2 coincides with the forms which are described in the previous exemplary embodiments. The collar 2 in this case can be fastened on the main body 3 by an adhesive. Alternatively, it is also possible, however, to form the inside diameter of the collar 2 so that this has to expand when fitting onto the cylindrical support section 4. In the fitted state, this then has a positive effect because the collar cannot be contracted again. This brings about favorable force conditions, in particular the friction force between collar 2 and support section 4 is increased which prevents slipping off of the collar. In this exemplary embodiment, the flange 10 is formed only by sections of the collar 2.

In the present description, it was assumed that the main body 3 is designed essentially in hollow cylindrical form. The main body 3 therefore has a round cross-sectional shape. It is clear, however, that the main body 3 can have any cross-sectional shape. The cross-sectional shape in this section, which in the inserted state abuts upon the insertion opening of the vessel 9, should be designed in conformance with the shape of this insertion opening 91. For example, an oval, polygonal or even a cornered shape can be used. Moreover, a main body 3 can have different cross-sectional shapes. For example, basic bodies which have round cross-sectional shapes are especially preferred, wherein the round cross-sectional shapes have different diameters so that a conical shape ensues.

The described filter insert 1, moreover, can selectively be used with a plunger, as known, for example, from WO 92/13475.

FIG. 6 shows a further exemplary embodiment of a filter element according to the present invention. In this exemplary embodiment, the main body 3 in the support section 7 has a shape which is different from the shape which is described above. Via a conically designed transition 71, the cylindrical main body 3 merges into a larger cross section 72. A conically tapering transition 73, which at the same time forms the end 74 of the filter element, is formed on this larger cross section 72. The collar 2, in the case of this embodiment, is located at a similar place as already described above. In this case, the collar 2 is designed so that its inside contour follows the outside contour of the support section. Also in this case, the collar 2 has a wave-form outside contour 21. FIG. 6 shows especially well how the wave-form outside contour 21 is adaptable to differently designed insertion openings 91. So, in this exemplary embodiment the wave-form outside contour 21 is compressed in a first step when inserting the filter insert 1 into the vessel 9 so that the filter insert 1 can be inserted. If the filter insert 1 is then inserted to the extent that the collar 2 lies upon the opening circumference 92, the wave-form outside contour expands until this lies upon an inner wall 93. In this exemplary embodiment, it is conceivable, moreover, that the wave-form outside contour 21 has at least three crests 22, wherein these are arranged in a spaced apart manner on the circumference of the collar 2. However, more crests and troughs are advantageously arranged over the circumference of the collar.

The invention claimed is:

1. A filter insert for inserting into an insertion opening of a vessel for the purpose of extraction of beverages, the filter insert comprising:
   a hollow main body, the main body being upwardly open and comprising a cylindrical filtering section, the cylindrical filtering section being provided with filtering holes, the main body further comprising a rigid support section arranged above the cylindrical filtering section, and the main body further comprising a rigid annular flange that projects radially outwards from the rigid support section, the rigid annular flange having a bottom surface, a top surface and an outer rim, and
   an elastic collar that is a structure separate from and attached to said hollow main body, the elastic collar covering an outside contour of the support section and of the flange, the elastic collar being made of a flexible and heat-resistant plastic for flexible adaptation to an inside dimension of the insertion opening of the vessel,
   the elastic collar comprising a lower portion having the form of a cylindrical ring, a middle portion above the lower portion, the middle portion having an elastic wave-form outside contour extending along a circumferential direction of the elastic collar like a rosette with alternating crests and troughs, said middle portion at said outside contour being compressible to provide a tight fit into said insertion opening of the vessel, and an upper portion, wherein the upper portion tightly fits over the annular flange so as to cover the bottom surface, the rim and at least part of the top surface of the annular flange.

2. The filter insert as claimed in claim 1, wherein the elastic collar is a one-piece structure.

3. The filter insert as claimed in claim 1, wherein the circumference of the elastic collar tapers in a lower region.

4. The filter insert as claimed in claim 1, wherein the wave-form outside contour extends around the entire circumference of the elastic collar.

5. The filter insert as claimed in claim 1, wherein the elastic collar is connected to the upper region of the main body in a fixed manner.

6. The filter insert as claimed in claim 1, wherein the elastic collar is removable from the main body.

7. The filter insert as claimed in claim 1, wherein the elastic collar is made from silicone rubber.

8. The filter insert as claimed in claim 1, wherein the main body is made from metal, glass, plastic or combinations thereof.

9. The filter insert as claimed in claim 1, wherein the elastic collar has a wave-form inside contour which lies only partially on the support section of the main body, and wherein a plurality of gaps are formed between the wave-form inside contour and the support section.

10. A vessel with the filter insert as claimed in claim 1, wherein the wave-form outside contour is in an at least partially non-positive locking engagement with the insertion opening of the vessel.

11. The vessel as claimed in claim 10, wherein the wave-form outside contour has a first diameter, which is measured from a first crest to a second opposite crest, wherein the insertion opening of the vessel has a second diameter, and wherein the first diameter is larger than the second diameter.

12. The filter insert as claimed in claim 1, wherein the filtering holes are provided in a plurality of parallel rows.

13. The filter insert as claimed in claim 1, wherein the crests and troughs of the elastic wave-form outside contour are smooth without sharp edges between crests and troughs along the circumferential direction.

14. The filter insert as claimed in claim 1, wherein said hollow main body has a round cross-sectional shape.

15. The filter insert as claimed in claim 1, wherein the main body is made of a rigid material.

16. The filter insert as claimed in claim 1, wherein the main body is made of metal, glass, or plastic.

17. The filter insert as claimed in claim 1, wherein the rigid support section comprises a cylindrical ring, a conical transition section arranged above the cylindrical ring, the conical transition section widening towards the top, and a cylindrical section arranged above the conical transition section, the annular flange projecting radially outward from the cylindrical section.

18. A combination comprising:
   a vessel, and
   a filter insert for inserting into an insertion opening of the vessel for the purpose of extraction of beverages, the filter insert comprising:
   a rigid hollow main body, the main body being upwardly open and comprising a cylindrical filtering section, the cylindrical filtering section having a side wall that is provided with filtering holes, the main body further comprising a rigid support section arranged above the cylindrical filtering section, and the main body further comprising a rigid annular flange that projects radially outwards from the rigid support section, the rigid annular flange having a bottom surface, a top surface and an outer rim, and
   an elastic collar that is a structure separate from and attached to said hollow main body, positioned in the inner circumference of the insertion opening of the vessel and covering an outside contour of the support section and of the flange, the elastic collar being made of a flexible and heat-resistant plastic for flexible adaptation to an inside dimension of the insertion opening of the vessel,
   the elastic collar comprising a lower portion having the form of a cylindrical ring, a middle portion above the lower portion, the middle portion having an elastic wave-form outside contour extending along a circumferential direction of the collar like a rosette with alternating crests and troughs, said middle portion at said outside contour being compressible to provide a tight fit into said insertion opening of the vessel, and an upper portion, wherein the middle portion surrounds the support section, and wherein the upper portion tightly fits over the annular flange so as to cover the bottom surface, the rim and at least part of the top surface of the annular flange.

19. The combination as claimed in claim 18, wherein the elastic collar further has a wave-form inside contour adjacent to the support section of the main body, gaps being formed between the support section and the wave-form inside contour, the gaps containing a gas.

20. The combination as claimed in claim 18, wherein said elastic collar is a one-piece structure.

21. The combination as claimed in claim 18, wherein said hollow main body has a round cross-sectional shape.

22. A filter insert for inserting into an insertion opening of a vessel for the purpose of extraction of beverages, the filter insert comprising:
   a hollow main body, the main body being upwardly open and comprising a cylindrical filtering section, the cylindrical filtering section being provided with filtering holes, the main body further comprising a transition section arranged above the cylindrical filtering section, the transition section having a conical shape and a cross section that increases in an upward direction, and a tapering section arranged above the transition section, the tapering section having a conical shape and a cross section that decreases in an upward direction, and an elastic collar that is a structure separate from and attached to said hollow main body, the elastic collar covering an outside contour of the transition section and of the tapering section, the elastic collar being made of a flexible and heat-resistant plastic for flexible adaptation to an inside dimension of the insertion opening of the vessel, the elastic collar having an elastic wave-form outside contour extending along a circumferential direction of the elastic collar like a rosette with alternating crests and troughs, said elastic collar at said outside contour being compressible to provide a tight fit into said insertion opening of the vessel.

* * * * *